(12) United States Patent
Weyer et al.

(10) Patent No.: US 8,495,877 B2
(45) Date of Patent: Jul. 30, 2013

(54) COMPOUND TURBOCHARGER SYSTEM HAVING A CONNECTABLE COMPRESSOR

(75) Inventors: Klaus Weyer, Ludwigsburg (DE); Manfred Dürnholz, Oberstenfeld (DE); Friedrich Wirbeleit, Esslingen (DE); Hermann Hiereth, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 1064 days.

(21) Appl. No.: 11/883,086

(22) PCT Filed: Dec. 13, 2005

(86) PCT No.: PCT/EP2005/056714
§ 371 (c)(1),
(2), (4) Date: Jun. 29, 2009

(87) PCT Pub. No.: WO2006/079433
PCT Pub. Date: Aug. 3, 2006

(65) Prior Publication Data
US 2011/0100339 A1 May 5, 2011

(30) Foreign Application Priority Data

Jan. 26, 2005 (DE) .................. 10 2005 003 714

(51) Int. Cl.
*F02G 3/00* (2006.01)
(52) U.S. Cl.
USPC .......................................................... 60/624
(58) Field of Classification Search
USPC .......................................................... 60/624
See application file for complete search history.

(56) References Cited

U.S. PATENT DOCUMENTS

| 4,616,482 | A | * | 10/1986 | Kronogard et al. | 60/624 |
|---|---|---|---|---|---|
| 4,884,407 | A | * | 12/1989 | Hatanaka | 60/624 |
| 5,033,269 | A | | 7/1991 | Smith | |
| 5,079,913 | A | * | 1/1992 | Kishishita | 60/624 |
| 5,119,633 | A | * | 6/1992 | Brooks et al. | 60/624 |
| 5,138,840 | A | * | 8/1992 | Oguchi et al. | 60/624 |
| 5,142,868 | A | * | 9/1992 | Woon et al. | 60/624 |
| 5,729,978 | A | * | 3/1998 | Hiereth et al. | 60/624 |
| 5,884,482 | A | * | 3/1999 | Lange et al. | 60/624 |
| 6,539,716 | B2 | * | 4/2003 | Finger et al. | 60/624 |
| 2003/0159441 | A1 | | 8/2003 | Kim et al. | |
| 2007/0186552 | A1 | * | 8/2007 | Vogelsang et al. | 60/624 |
| 2009/0031725 | A1 | * | 2/2009 | Schenck et al. | 60/624 |

FOREIGN PATENT DOCUMENTS

| CH | 314435 A * | 6/1956 |
|---|---|---|
| DE | 3224006 | 12/1983 |
| DE | 19514572 | 10/1996 |
| EP | 0718481 | 6/1996 |
| WO | WO 9741338 A1 * | 11/1997 |

* cited by examiner

Primary Examiner — Mary A Davis
(74) Attorney, Agent, or Firm — Kenyon & Kenyon LLP

(57) ABSTRACT

The invention relates to an internal combustion engine having a turbocompound system. The turbocompound system encompasses an exhaust-gas turbocharger, a turbo intercooler, and a power turbine. The power turbine is connectable, via a transmission with clutch, to the crankshaft of the internal combustion engine. A connectable compressor, which is couplable either to the power turbine or to the internal combustion engine, is received in a multiple-flow intake pipe.

22 Claims, 1 Drawing Sheet

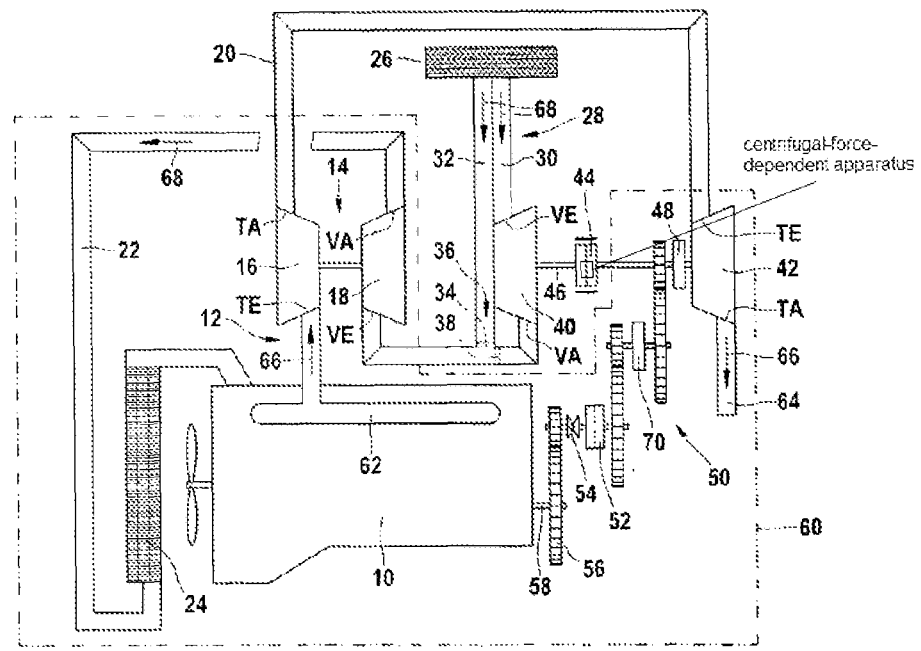

COMPOUND TURBOCHARGER SYSTEM HAVING A CONNECTABLE COMPRESSOR

FIELD OF THE INVENTION

Supercharging devices such as, for example, exhaust-gas turbochargers are employed on internal combustion engines in order to make use, on the turbine side, of the exhaust energy that can no longer be utilized as a result of the limited expansion stroke, and thereby compress, on the compressor side, the aspirated combustion air. For a given engine displacement volume, a greater mass of air can thereby be conveyed into the combustion chambers of the internal combustion engine, so that more fuel can be injected and more engine power can thereby be achieved. There are a number of variant embodiments of exhaust-gas turbocharger systems; fixed-geometry chargers may be mentioned, as well as supercharging systems having smaller turbines with a wastegate (WG) control system for better responsiveness, as well as turbochargers that are equipped with variable turbine geometry (VTG). The wastegate control system and variable turbine geometry contribute chiefly to improved efficiency and dynamics.

BACKGROUND INFORMATION

German Patent Publication No. DE 195 14 572 discloses a supercharged internal combustion engine. The supercharged internal combustion engine encompasses a high-pressure section and a low-pressure section that is larger as compared with the high-pressure section, in which engine, using a switchover apparatus, the high- and low-pressure sections are connected in series in the lower rotation-speed range of the internal combustion engine, and as the rotation speed of the internal combustion engine rises, the exhaust gas is for the most part guided, by switchover of the switchover apparatus, past a high-pressure turbine and introduced directly into a low-pressure turbine. The low-pressure turbine is embodied in double-flow fashion; in two-stage operation, switchover apparatus 13 connects the output of the high-pressure turbine via exhaust-gas ducts to both bores of the low-pressure turbine, and that after rotation of a flap valve of the switchover apparatus, the high-pressure turbine is bypassed and separate exhaust sections of the internal combustion engine are connected directly, using the exhaust-gas ducts, to the two bores of the low-pressure turbine. A venting valve is provided that is inserted into a bypass duct, which duct connects the exhaust section to a connector fitting of the switchover apparatus; and that the venting valve is opened upon a smooth transition from two-stage to single-stage operation, so that in the transition region between the lower and medium rotation speed of the internal combustion engine, exhaust gas can partially be delivered out of the exhaust section directly to the low-pressure turbine. In single-stage operation, the high-pressure compressor can be bypassed by way of a boost air duct connected in parallel, so that only a small volume of cool air flows through the high-pressure compressor. This system is made up in principle of two exhaust-gas turbochargers connected one behind the other: the high-pressure and low-pressure exhaust-gas turbochargers. The air mass that is delivered can be greatly increased by the two-stage supercharging, and emissions and/or engine power output can thus be improved. Two-stage supercharging is utilized in large-engine design, e.g. in ship drive systems or in power-generating stations. Additionally known are mechanical supercharging systems in which the compressor is driven via a transmission directly by the internal combustion engine. The drive power required for the compressor is obtained not from the exhaust-gas energy, but instead is made available directly at the internal combustion engine.

In commercial-vehicle engines, turbocompound systems are by now preferably also being used. In these systems, the usable output of the internal combustion engine is generated not by the working cylinder but also with a supercharging device such as, for example, an expansion section downstream from an exhaust-gas turbocharger. This additionally generated power is fed back to the crankshaft of the internal combustion engine via a reduction transmission, a freewheel, and a damping clutch, or alternatively via a hydraulic converter. This system is used in commercial vehicles in order to make further use of the energy remaining in the exhaust gas after the turbocharger has been driven, and thus further to reduce fuel consumption.

The aforementioned supercharging devices for internal combustion engines present certain problems, however. For example, a rise in boost pressure can be achieved only by increasing the charger rotation speed, for which on the one hand sufficient exhaust-gas energy must be present, and the latter must also be sufficient additionally to overcome the moment of inertia of the charger as it is accelerated to higher rotation speeds. The dynamic behavior of such a system is thus subject to limitations.

The aforementioned turbocompound system is used for optimum utilization of exhaust-gas energy, but can feed energy back to the crankshaft of the internal combustion engine in satisfactory fashion only at higher loads and rotation speeds of the internal combustion engine.

Performance losses occur in the context of exhaust-gas recirculation applications and supercharging systems used in standard fashion hitherto. Emissions adaptation at high exhaust-gas recirculation rates is possible, in supercharging systems used at present, only at the cost of a decrease in rated power, since a supercharging system complying with Euro 4 commercial-vehicles standards requires high exhaust-gas recirculation rates even with the internal combustion engine at full load. In conventional supercharging systems, however, particulate emissions exceed the limit value in order to maintain NOx emissions, and thus require the use of an exhaust post-treatment system, e.g. a diesel particulate filter.

DESCRIPTION OF THE INVENTION

In accordance with the approach to achieving the object proposed according to the present invention, the combination of a turbocompound system and having a connectable additional flow compressor that is disposed on the same shaft as the power turbine, is proposed. In addition to an exhaust-gas turbocharger disposed in the exhaust section of an internal combustion engine, the internal combustion engine is therefore followed by a connectable compressor on the fresh-air side, and on the exhaust-gas side the already existing exhaust-gas turbocharger is followed by a power turbine. The above-described combination thus has the following properties: As a result of the coupling of the additional compressor with the crankshaft of the internal combustion engine, boost pressure is generated regardless of the availability of exhaust-gas energy, which leads to considerable torque increases at low engine speeds and thus substantially improves the initial-movement behavior that can be achieved with the above-described combination. Because of the elevated engine output in the low-rotation-speed range of the internal combustion engine, the exhaust-gas turbocharger also begins to act very early on and then constitutes, together with the additional compressor, a two-stage supercharging system with high achievable excess air values, thereby making it easier to comply with emission limits. In addition to the exhaust-gas turbocharger driven by the exhaust-gas energy of the internal combustion engine, compliance with Euro 5 standard limits for commercial vehicles can be, assured, without performance losses, by way of the two-stage supercharging, i.e. operation of the additional compressor by the power turbine, despite the high exhaust recirculation rates that result.

The turbocompound system associated with the internal combustion engine encompasses an air filter through which fresh air is aspirated from the environment. The aspirated fresh air is delivered via the compressor portion of the exhaust-gas turbocharger and then, after passing through the turbo intercooler, to the internal combustion engine. The exhaust gas of the internal combustion engine leaves the latter via the exhaust manifold and drives the turbine part of the exhaust-gas turbocharger. The turbocompound system furthermore encompasses a second power turbine that transfers the residual energy inherent in the exhaust gas, via a reduction transmission configured in one or multiple stages, a damping clutch, and a closed (in the case of energy input) freewheel, directly to the crankshaft of the internal combustion engine.

What is characteristic of the proposed approach is an air section that enables parallel air flows and extends out from the air filter toward the additional connectable compressor, and through which an additional air volume can be conveyed. The connectable compressor works, via a controllable clutch embodied mechanically, electrically, or hydraulically, on the same shaft that is associated with additional second power turbine of the turbocompound, thus yielding (when the clutch is closed) a second exhaust-gas turbocharger; in other words, two-stage supercharging of the internal combustion engine is thereby implemented. The additional second compressor can be driven on the one hand directly by the internal combustion engine. For that purpose, the connectable additional compressor is driven by the internal combustion engine via the reduction transmission and the freewheel (which in this case is locked). In order to preclude abrupt acceleration of the connectable additional compressor, which would result in damage to the reduction transmission or to the compressor, an additional clutch is used that preferably is embodied controllably. This controllable clutch is disposed on the shaft between the additional compressor and the power turbine. In situations of rapid load changes, the additional compressor is started up as a function of the air demand and increases the delivery of fresh air into the combustion chamber of the internal combustion engine. Examples of situations of rapid load changes that might be mentioned are on the one hand initial movement, since especially in the case of commercial vehicles, large initial-movement torques must be achieved at the lowest possible engine speed in order to minimize the input of waste heat into the clutch. A further subsidiary instance of a rapid load change exists, for example, after the internal combustion engine is started and the individual gear ratios have subsequently been shifted through, or in difficult terrain with severe changes in load. To implement this, a nonreturn valve is necessary, which prevents pre-compressed fresh air from escaping through the air filter.

A further enhancement of response and of the efficiency of the proposed approach can be achieved by the fact that if using a freewheel or a switchable clutch, in the event of acceleration of the internal combustion engine the power turbine can be disconnected and its mass need not also be accelerated.

The turbocompound system of itself offers the possibility that the output power of the power turbine can both be delivered to the crankshaft of the internal combustion engine, and also used to precompress fresh air. The aforementioned two-stage supercharging that can be implemented in accordance with the proposed approach by way of a direct connection of the power turbine and the additional compressor allow on the one hand the requisite Euro 5 emission limits for commercial vehicles to be complied with without an exhaust-gas posttreatment system and without significant performance losses. At low loads and high engine speeds, however, a conventional single-stage supercharging concept is entirely sufficient. This can be achieved, according to the proposed approach, by the fact that the clutch between the additional compressor and the power turbine is opened. If pure two-stage supercharging operation is desired, a decoupling of the power turbine can be accomplished via the freewheel, by interrupting the connection between the power turbine and the reduction transmission or the internal combustion engine itself. If the clutch between the additional compressor and the power turbine is embodied clutch that can be hydraulically filled and emptied, the rotation speed of the additional compressor can be controlled as desired. This offers advantages in terms of controlling both the engine braking output when the internal combustion engine is in braking mode, and the supercharging ratio or air ratio in engine mode. When the internal combustion engine is in braking mode, the additional compressor is driven directly by the internal combustion engine and thereby delivers more air into the combustion chambers of the internal combustion engine, thus promoting cooling of the components as well as an improvement in braking effect. In engine braking systems, in braking mode air is usually aspirated by the internal combustion engine and compressed during the compression stroke thereof. Once the work of compression has been performed, the compressed air is expelled through a special valve, meaning that the compression work previously performed cannot be recovered, in the manner of a "gas spring," during subsequent expansion.

BRIEF DESCRIPTION OF THE DRAWING

The invention is described more thoroughly below with reference to the drawings.

The single FIGURE shows an internal combustion engine having a turbocompound system, the turbocompound system including a power turbine that is coupled to an additional compressor that can be connected and disconnected via a clutch, a double-flow intake air section being associated with said compressor.

DESCRIPTION

Evident from the single FIGURE is an internal combustion engine 10 associated with which is a turbocompound system 60. Turbocompound system 60 encompasses an exhaust-gas turbocharger 14 that is received in exhaust section 12 of internal combustion engine 10. Exhaust-gas turbocharger 14 in turn encompasses a turbine part 16 as well as a compressor part 18. Turbine part 16 of exhaust-gas turbocharger 14 is impinged upon by exhaust gas 66 that flows in an exhaust-gas duct 20 of internal combustion engine 10 in exhaust-gas section 12. Turbocompound system 60 furthermore encompasses a turbo intercooler 24 that is received in an intake air duct 22 extending out from compressor part 18 of exhaust-gas turbocharger 14, and that cools the precompressed intake air before the latter is delivered to internal combustion engine 10. Turbocompound system 60 lastly encompasses a power turbine 42 that can be coupled via a reduction transmission 50, using a damping clutch 52 and a freewheel 54, to crankshaft 58 of internal combustion engine 10, and can also be decoupled again therefrom.

Power turbine 42 provided in turbocompound system 60 is attached to exhaust-gas duct 20 in the flow direction of exhaust gas 66 after passage through turbine entry TE of turbine part 16 and after passage through turbine exit TA of turbine part 16. The inlet of power turbine 52 is labeled TE, and the outlet of power turbine 42 TA. Attached to turbine outlet TA of power turbine 42 is a duct 64 (not depicted in further detail) to the exhaust-gas muffler.

According to the idea underlying this system, power turbine 42 provided in turbocompound system 60 is used to utilize the residual energy that remains in exhaust gas 66, i.e. has not previously been exploited, after passage through turbine part 16 of exhaust-gas turbocharger 14. This is generally accomplished by the fact that power turbine 42 acts on crankshaft 52 of internal combustion engine 10 via transmission 50, which as a rule is embodied as a reduction transmission, damping clutch 52, and a freewheel 54 that is closed in the event of energy delivery to internal combustion engine 10. An additional torque is thus transferred to crankshaft 52 of internal combustion engine 10.

The combination proposed according to the present invention of a turbocompound system 60 with a further, additional compressor 40 makes it possible, advantageously, to convey an additional air volume from an intake pipe 28 embodied in multiple-flow fashion, via an air filter 36, to internal combustion engine 10. Multiple-flow intake pipe 28 encompasses a first air section 30 and a further second air section 32 at whose opening point into intake air duct 22 a nonreturn valve 34 is recessed. Nonreturn valve 34 can be embodied, for example, in the form of a flap, and is displaceable in intake air duct 22 between a first position 36 and a second position 38.

Intake air aspirated in multiple-flow intake pipe 28 through air filter 26 is identified by the reference character 68. Received between the additional connectable compressor 40 and power turbine 42, on a drive shaft 46 extending between these components, are a controllable clutch 44 and a clutch 48 with freewheel. Clutch 48 with freewheel is disposed on drive shaft 46 between power turbine 42 and the torque takeoff point of reduction transmission 50, while the controllably embodied clutch 44 is located between the torque takeoff point of reduction transmission 50 and the additional connectable compressor 40. Controllable clutch 44 can be embodied either hydraulically or electrically, or also mechanically. A combination of these types of embodiment with one another is also possible.

Transmission 50, which preferably is configured as a reduction transmission, encompasses a damping clutch 52 to damp torque pulses as well as a freewheel 54 that is integrated between reduction transmission 50 and a flywheel 56 that is disposed on crankshaft 58 of internal combustion engine 10. For the sake of completeness, it may be mentioned that exhaust gas 66 is conveyed to exhaust-gas duct 20 via an exhaust manifold 62 of internal combustion engine 10. In addition, a clutch 70 is integrated into transmission 50 that is embodied in particular as a reduction transmission. When controllable clutch 44 is closed, clutch 70 allows inertial two-stage exhaust-gas turbocharger operation of exhaust-gas turbocharger 14 and of the further exhaust-gas turbocharger that is constituted by the components—power turbine 42 and the additional connectable compressor 40—that are coupled to one another.

With the combination proposed according to the present invention of turbocompound system 60 associated with internal combustion engine 10 and the connectable further compressor 40, a variety of operating modes of internal combustion engine 10 can be implemented as a function of the driving situation:

In order to improve the dynamics of internal combustion engine 10, the possibility now exists of driving additionally compressor 40 directly via internal combustion engine 10. For that purpose, flywheel 56 on crankshaft 58 is connected, via freewheel 54 (locked in this instance) and the closed damping clutch 52, to reduction transmission 50, which in turn drives drive shaft 46 of connectable compressor 40. Controllable clutch 44 is closed in this operating mode, so that connectable compressor 40 can be started up via drive shaft 46. It is furthermore possible, by way of the controllably embodied clutch 44, to avoid abrupt acceleration of the additional connectable compressor 40, which would result in damage to transmission 50 or to the additional connectable compressor 40. Alternatively, it is also conceivable to embody damping clutch 52 as well as freewheel 54 (which, is locked in the operating mode explained above) in controllable fashion, or replace it with a shiftable clutch. In the case where a shiftable clutch is used, damping clutch 52 can remain continuously filled, which has proven very favorable because of the filling and emptying times of such a clutch.

In this operating mode, the connectable additional compressor 40 is started up as a function of the air demand of internal combustion engine 10 and increases the delivery of fresh air into the combustion chambers of internal combustion engine 10. In this case nonreturn valve 34, which can be embodied in flap form, is in its first position 36, thus preventing the fresh air precompressed by the additional connectable compressor 40 from escaping in "short-circuit" fashion at air filter 26 through second air section 38 of multiple-flow intake pipe 28. A further increase in dynamic responsiveness and efficiency can be achieved by the fact that upon acceleration of the internal combustion engine, power turbine 42 can be disconnected from drive shaft 46 by way of clutch 48 with freewheel, so that said shaft therefore no longer needs also to be accelerated. The energy transferred via transmission 50 from flywheel 56 of crankshaft 58 to the additional connectable compressor 40 is thus available for conveyance of an additional air volume through intake air duct 22 to compressor part 18 of exhaust-gas turbocharger 14, and from there to turbo intercooler 24 and into internal combustion engine 10.

With reference to the operating mode outlined above, an improvement in vehicle dynamics can be achieved in driving maneuvers such as, for example, difficult conditions for initial movement on a slope or braking by way of the engine brake. By way of the operating mode of internal combustion engine 10 outlined above, emission limits can be complied with even in a context of rapidly and dynamically occurring load changes, since in this operating mode an additional air volume is conveyed to the internal combustion engine.

In a further operating mode, by way of the combination proposed according to the present invention of a turbocompound system 60 with a further, connectable compressor 40, a second exhaust-gas turbocharger can be realized. In this operating mode, the connectable further compressor 40 is connected directly to power turbine 42 via drive shaft 46, both clutch 44 and clutch 48 with freewheel being closed. In this operating mode, damping clutch 52 between transmission 50 and flywheel 46 of internal combustion engine 10 is open, i.e. this connection path is interrupted. If, in this operating mode, the freewheel associated with clutch 48 is replaced by a shiftable clutch, damping clutch 52 can remain filled, which is favorable (as already alluded to above) because of the requisite filling and emptying times.

In this operating mode, first exhaust-gas turbocharger 14 encompassing a compressor part 18 and a turbine part 16 is followed by a second exhaust-gas turbocharger that encompasses as components additional compressor 40 and power turbine 42, which are joined nonrotatably to one another via a drive shaft 46, closed clutch 44, and (likewise closed) clutch 48 with freewheel.

Utilization of the residual energy inherent in exhaust gas 66 after passage through exhaust-gas turbocharger 14 can be achieved by way of turbocompound system 60. The combination proposed according to the present invention of turbocompound system 60 with the additional connectable compressor 40 furthermore offers the possibility of both delivering the output power of power turbine 42 to crankshaft 58 of internal combustion engine 10 in exclusive turbocompound-system operating mode, and precompressing the aspirated fresh air and conveying that precompressed fresh air to the combustion chambers of internal combustion engine 10, thereby allowing an improvement in efficiency and thus a decrease in fuel consumption to be achieved. In the two-stage supercharging operating mode, i.e. with a direct connection of power turbine 42 to additional compressor 40 via drive shaft 46, controllable clutch 44 being closed and clutch 48 with freewheel also being closed, the requisite Euro 5 commercial-vehicle, emissions limits can be complied with without the use of an additional exhaust-gas post-processing system and with no loss of performance in the internal combustion engine. With the internal combustion engine at low loads and high rotation speeds, the approach proposed according to the present invention offers the advantage of being operable in this operating mode as a conventional single-stage supercharging concept, which can be advantageous in terms of fuel consumption. In this case exhaust-gas turbocharger 14 would be active within turbocompound system 60, whereas controllable clutch 44 between power turbine 42 and the additional connectable compressor 40 would be open. In this case power turbine 42 additionally drives flywheel 46 of crankshaft 58 of internal combustion engine 10 via transmission 50, which is connected when clutch 48 with freewheel is closed. In the event internal combustion engine 10 is operated exclusively with two-stage supercharging, transmission 50 can be disconnected from crankshaft 58 of the internal combustion engine by opening freewheel 54, controllable clutch 44 being closed and clutch 48 with freewheel being closed.

Controllable clutch 44, which can be embodied in particular as a hydraulically fillable and hydraulically emptyable clutch, moreover offers the advantage of arbitrarily controlling or regulating the rotation speed of connectable additional compressor 40. it is thus possible both to influence engine braking power in the engine-braking operating mode and, with internal combustion engine 10 in engine mode, to influence the supercharging ratio or the air ratio λ. In the engine-braking operating mode, the additional connectable compressor 40 is driven by internal combustion engine 10 as explained above, and thereby conveys an additional air volume into the combustion chambers of the internal combustion engine. This makes it possible, advantageously, to achieve both component cooling and an improvement in braking effect. In commercial vehicles, non-abrasion retarder brakes used hitherto can most easily be implemented using an engine brake. In the simplest case, this engine brake encompasses a throttle valve in the exhaust region, with which a braking power of approx. 30% of rated engine output can be achieved. If this engine braking output is to be further increased, it is necessary on the one hand to prevent the air compressed in the combustion chamber from storing the majority of the expended compression energy as a "gas spring" and returning it to the crankshaft upon expansion. Solutions to this include a constant-throttle system in which an additional valve in the cylinder-head region of the internal combustion engine is opened in engine-braking mode and thus diminishes the gas-spring effect of the aspirated air upon expansion, although it also, because it is continuously open, reduces the compression energy that can be applied and is thus effective with regard to the engine braking system. A further rise in the braking output of an internal combustion engine results when the air throughput through the internal combustion engine in braking mode can be increased. Cam rings have hitherto been used for this. In engine braking mode, a cam ring is inserted into the turbine housing upstream from the turbine part, so that the inflow cross section at turbine part TE is greatly reduced in order to increase the turbine output, thus resulting in a higher "braking boost pressure." The elevated air throughput also causes the internal cooling of the combustion chamber to rise, resulting in lower component temperatures and thus decreased component stresses. The need still remains, however, for a throttle valve in the exhaust behind the turbine part (viewed in the flow direction of the exhaust gas). In the engine braking mode, the additionally connectable compressor 40, which is driven by internal combustion engine 10 as explained above, permits delivery of an additional air volume into the combustion chambers of the internal combustion engine. This allows both component cooling and an improvement in braking effect to be achieved while dispensing with the aforesaid cam ring system.

Internal combustion engine 10 proposed according to the present invention, having turbocompound system 60 and the additional connectable compressor 40 associated therewith, is suitable in particular for applications in the commercial-vehicle sector. The approach proposed according to the present invention advantageously permits a rise in the efficiency, and a decrease in the fuel consumption, of internal combustion engine 10. Utilization of the concept proposed according to the present invention furthermore allows strict Euro 5 limit values for commercial vehicles to be achieved while dispensing with an additional, costly exhaust-gas post-treatment system, in particular on commercial vehicles. In terms of applications to commercial vehicles, the use of diesel particle filters, which are increasing in use in the passenger-car sector, presents disadvantages chiefly in that the diesel particle filters hitherto available have too short a service life as compared with the lifespan of a commercial vehicle, and that the backpressure produced by the diesel particle filter may inevitably be expected to create a rise in fuel consumption.

LIST OF REFERENCE CHARACTERS

10 Internal combustion engine
12 Exhaust section
14 Exhaust-gas turbocharger
16 Exhaust-gas turbocharger turbine part
18 Exhaust-gas turbocharger compressor part
20 Exhaust-gas duct
22 Intake air duct
24 Turbo intercooler
26 Air filter
28 Multiple-flow intake pipe
30 First air section
32 Second air section
34 Flap-shaped nonreturn valve
36 First position of nonreturn valve
38 Second position of nonreturn valve 40 Connectable compressor
42 Power turbine
44 Controllable clutch
46 Drive shaft of connectable compressor
48 Clutch with freewheel
50 Transmission (reduction transmission)
52 Damping clutch
54 Freewheel
56 Flywheel crankshaft
58 Turboshaft
60 Turbocompound system
62 Exhaust manifold
64 Duct to exhaust-gas muffler
66 Exhaust gas
68 Intake air
70 Clutch for two-stage exhaust-gas turbocharger operation
TE Turbine entry
TA Turbine exit
VE Compressor entry
VA Compressor exit

What is claimed is:

1. An internal combustion engine, comprising:
a transmission with damping clutch;
a crankshaft;
a turbocompound system that includes:
an exhaust-gas turbocharger,
a turbo intercooler,
a power turbine that is connectable, via the transmission with damping clutch, to the crankshaft; and
an additional connectable compressor couplable to the power turbine,
wherein the power turbine and the additional connectable compressor are couplable to one another via a drive shaft that includes a controllable clutch as well as a freewheel clutch with freewheel.

2. The internal combustion engine as recited in claim 1, further comprising:
an intake pipe encompassing at least a first air section and a second air section.

3. The internal combustion engine as recited in claim 2, wherein one of the first and second air sections terminates at the additional connectable compressor, and the other of the first and second air sections encompasses a nonreturn valve in order to bypass the additional connectable compressor.

4. The internal combustion engine as recited in claim 3, wherein the nonreturn valve, in a first position, closes off the opening of one of the first and second air sections into the intake air duct.

5. The internal combustion engine as recited in claim 1, wherein the controllable clutch is disposed on the drive shaft between the additional connectable compressor and an incoupling point of a torque of the transmission.

6. The internal combustion engine as recited in claim 1, wherein the freewheel clutch is disposed on the drive shaft between the power turbine and an incoupling point of a torque of the transmission.

7. The internal combustion engine as recited in claim 1, wherein the controllable clutch includes a hydraulically fillable and hydraulically emptyable clutch.

8. The internal combustion engine as recited in claim 1, wherein the controllable clutch is equipped, for rotation speed limitation, with a centrifugal-force-dependent apparatus for oil outlet.

9. The internal combustion engine as recited in claim 1, wherein the transmission includes an at least one-stage reduction transmission that encompasses the damping clutch and a lockable or releasable freewheel.

10. The internal combustion engine as recited in claim 9, wherein a reduction transmission clutch that, when the controllable clutch is closed, enables low-inertia operation of the exhaust-gas turbocharger is disposed in a reduction set of the transmission.

11. A method for operating the internal combustion engine of claim 1, comprising:
operating the internal combustion engine in one of an exclusively turbocompound operating mode, a "two-stage supercharging" operating mode, a "two-stage supercharging with turbocompound support" mode, an "engine brake" mode, and an "additional air volume delivery" mode.

12. The method for operating an internal combustion engine as recited in claim 11, wherein in the turbocompound operating mode with the controllable clutch of the drive shaft open, the useful power of the power turbine is transferred, when the freewheel clutch is closed, via the transmission to the crankshaft of the internal combustion engine.

13. The method for operating an internal combustion engine as recited in claim 11, wherein in the "additional air delivery" operating mode, the additional compressor is driven by the internal combustion engine and delivers additional air.

14. The method for operating an internal combustion engine as recited in claim 13, wherein the damping clutch and the freewheel of the transmission are closed.

15. The method for operating an internal combustion engine as recited in claim 13, wherein the controllable clutch of the drive shaft is closed.

16. The method for operating an internal combustion engine as recited in claim 13, wherein the nonreturn valve is set to its first position and prevents the escape of precompressed intake air of the connectable compressor.

17. The method for operating an internal combustion engine as recited in claim 13, wherein the power turbine is disconnected from the additional connectable compressor by opening the freewheel clutch.

18. The method for operating an internal combustion engine as recited in claim 13, wherein the rotation speed of the additional compressor is variable by way of the controllable clutch having a centrifugal-force actuated apparatus for oil outlet.

19. The method for operating an internal combustion engine as recited in claim 11, wherein in the "two-stage supercharging" operating mode, the power turbine is connected via the drive shaft to the connectable additional compressor, the controllable clutch being closed and the freewheel clutch being closed, and the damping clutch or the freewheel of the transmission is closed.

20. The method for operating an internal combustion engine as recited in claim 11, wherein in the "engine brake" operating mode, the additional connectable compressor is driven via the transmission by the internal combustion engine.

21. The method for operating an internal combustion engine as recited in claim 20, wherein the power turbine is disconnected from the additional connectable compressor.

22. The method for operating an internal combustion engine as recited in claim 11, wherein the drive power of the power turbine is both deliverable to the crankshaft of the internal combustion engine and usable for the compression of intake air.

* * * * *

UNITED STATES PATENT AND TRADEMARK OFFICE
CERTIFICATE OF CORRECTION

PATENT NO. : 8,495,877 B2  Page 1 of 1
APPLICATION NO. : 11/883086
DATED : July 30, 2013
INVENTOR(S) : Weyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1698 days.

Signed and Sealed this

Fifteenth Day of September, 2015

Michelle K. Lee
*Director of the United States Patent and Trademark Office*